United States Patent
Lorello et al.

(10) Patent No.: US 8,592,742 B2
(45) Date of Patent: Nov. 26, 2013

(54) CIRCUIT AND METHOD FOR CONTROLLING CURRENT SUPPLIED TO AN OPTICAL SENSOR

(75) Inventors: Michael J. Lorello, Guilford, CT (US); Gary S. Jacobson, Norwalk, CT (US); George J. Doutney, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 406 days.

(21) Appl. No.: 12/971,053

(22) Filed: Dec. 17, 2010

(65) Prior Publication Data

US 2012/0152696 A1 Jun. 21, 2012

(51) Int. Cl.
*H01J 40/14* (2006.01)
*H03F 3/08* (2006.01)

(52) U.S. Cl.
USPC .............. 250/214 R; 250/214 DC; 250/208.2

(58) Field of Classification Search
USPC ............ 250/208.1, 214.1, 214 R, 559.4, 206, 250/214 DC, 208.2
See application file for complete search history.

(56) References Cited

U.S. PATENT DOCUMENTS

| | | | |
|---|---|---|---|
| 6,359,287 B1 * | 3/2002 | Voser et al. | 250/559.36 |
| 7,061,001 B2 | 6/2006 | Chaudhary et al. | |
| 2004/0262549 A1 * | 12/2004 | Chaudhary et al. | 250/559.45 |
| 2009/0090843 A1 * | 4/2009 | Lim et al. | 250/205 |
| 2011/0140879 A1 | 6/2011 | Minckler | |

* cited by examiner

Primary Examiner — Francis M Legasse, Jr.
(74) Attorney, Agent, or Firm — Brian A. Lemm; Charles R. Malandra, Jr.; Steven J. Shapiro

(57) ABSTRACT

A system and method for adjusting the LED current of an optical sensor that does not decrease the effectiveness of the optical sensor or the length of its operating life, or significantly increase the cost due to hardware requirements. The LED current of an optical sensor is adjusted using a high frequency pulse-width modulated signal generated from a microcontroller. Based on feedback provided by the photo-detector, the duty cycle of the signal can be adjusted by the microcontroller. The signal passes through a low pass filter which averages the modulated signal into a DC voltage, which is then used to control a current amplifier circuit that provides current to the LED of the optical sensor. This adjustability enables the system to compensate for variations in sensor LED's and the LED brightness reduction to due aging and/or build-up of contaminants on the photo-detector and/or LED.

15 Claims, 4 Drawing Sheets

CIRCUIT AND METHOD FOR CONTROLLING CURRENT SUPPLIED TO AN OPTICAL SENSOR

FIELD OF THE INVENTION

The invention disclosed herein relates generally to optical sensing systems, and more particularly to calibrating optical sensor systems utilized in mail processing systems.

BACKGROUND OF THE INVENTION

Mail processing systems for preparing mail pieces have long been well known and have enjoyed considerable commercial success. There are many different types of mail processing systems, including, for example, inserter systems that insert material into envelopes and mailing machines that print postage indicia on mail pieces. Optical sensors are commonly used in such mail processing systems to ensure that all parts in the system function in a coordinated way. For example, in a mail inserting system where a plurality of enclosure feeders are used to release documents onto a transport path and the released documents are collated into a stack for insertion into an envelope, optical sensors can be used to check the arrival of the envelope, the movement of the released documents, and so forth. Mailing machines range from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. Such modules could include, for example, a singulating module, i.e., separating a stack of mail pieces such that the mail pieces are conveyed one at a time along a transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user. Optical sensors are commonly used to track the location of each mail piece as it passes through the machine via the transport mechanism. Based on the location of the mail piece, certain functions are initiated, e.g., weighing, printing, etc. Additionally, optical sensors can be utilized to determine if a mail piece has become jammed within the mailing machine.

As illustrated in FIG. 1A, an optical sensor 10, in general, comprises a photo-detector 12 and a light-emitting diode (LED) 14. When the optical sensor 10 is active, the LED 14 is activated to produce light to illuminate the photo-detector 12. When the photo-detector 12 is not blocked, the light from the LED 14 is detected by the photo-detector 12. In this state, the output voltage of the photo-detector 12 circuit is generally low. But when the photo-detector 12 is blocked by an object coming into the space between the LED 14 and the photo-detector 12, such as a mail piece 16 moving in the direction of arrow A, as illustrated in FIG. 1B, the light from the LED 14 does not illuminate the photo-detector 12, which causes the photo-detector 12 to be in a high resistive state. In this state, the output voltage of the photo-detector 12 circuit is generally high or substantially equal to the supply voltage. Alternatively, the output voltage of the photo-detector 12 could be opposite as described, depending on the circuit configuration, e.g., unblocked has a high output, and blocked has a low output. In general, the output voltage of a photo-detector 12 depends on the light that is detected by the photo-detector 12, which in turn depends on output of the LED 14, the distance of the photo-detector from the LED, the alignment between the photo-detector and the LED, and so forth. In order to ensure that the photo-detector 12 receives sufficient light when it is not blocked, the supply current to the LED 14 is usually set to a value that is higher than threshold value at which the photo-detector 12 would change the state of its output voltage.

Mail processing systems present a challenging environment for optical sensors. A long operating life combined with contamination such as paper dust build-up cause the operating characteristics of a sensor to deviate from the initial "brand-new" values. Optical sensors have to be designed with enough operating margin to overcome issues such as LED aging and dust build-up to ensure that the supply current to the LED is large enough such that sufficient light is detected by the photo-detector when not blocked. There are several conventional ways to achieve this, but each has problems. One method of achieving this is to increase the LED current. This, however, can reduce the sensor's ability to detect thinner material (as the light intensity may allow sufficient light to pass through thinner materials such that the optical detector detects enough light to remain in an "unblocked" state) as well as reduce the overall LED operating life. Another method to achieve this is to use detectors that are more sensitive. This, however, could lead to false triggers due to external light sources. Another method to achieve this is by the use of current amplifiers that require a digital to analog converter for each sensor. This, however, could significantly increase the cost of the machine, depending on the number of optical sensors utilized in the system.

SUMMARY OF THE INVENTION

The present invention alleviates the problems associated with the prior art and provides a system and method for adjusting the LED current of an optical sensor that does not decrease the effectiveness of the optical sensor or the length of its operating life, or significantly increase the cost due to hardware requirements.

In accordance with embodiments of the present invention, the LED current of an optical sensor is adjusted using a high frequency pulse-width modulated signal generated from a microcontroller. Based on feedback provided by the photo-detector, the duty cycle of the signal can be adjusted by the microcontroller. The signal passes through a low pass filter which averages the modulated signal into a DC voltage. The DC voltage is then used to control a current amplifier circuit that provides current to the LED of the optical sensor. When used in a system application, the sensor control of the present invention enables a microcontroller to utilize internal timer resources to adjust the current to the LED of an optical sensor. This adjustability enables the system to compensate for variations in sensor LED's and the LED brightness reduction to due aging and/or build-up of contaminants such as paper dust on the photo-detector and/or LED. This adjustability is provided with only an additional low pass filter, e.g., a single resistor and capacitor, instead of a complex, expensive digital to analog converter chip.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1A:
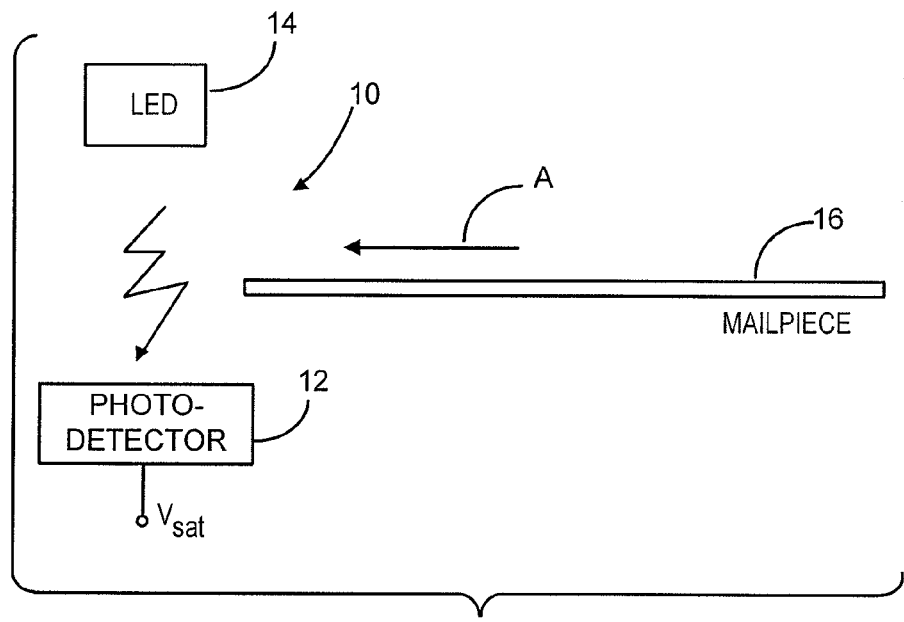
FIG. 1A is a schematic representation illustrating an optical detector being used to detect the arrival of a mail piece.
Figure 1B:
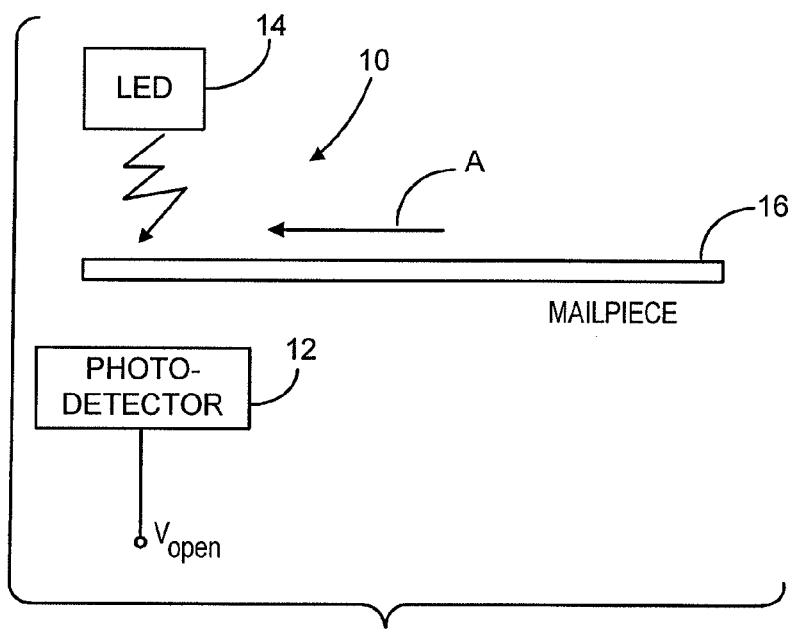
FIG. 1B is a schematic representation illustrating the photo-detector of the optical sensor being blocked by the arriving mail piece.
Figure 2:
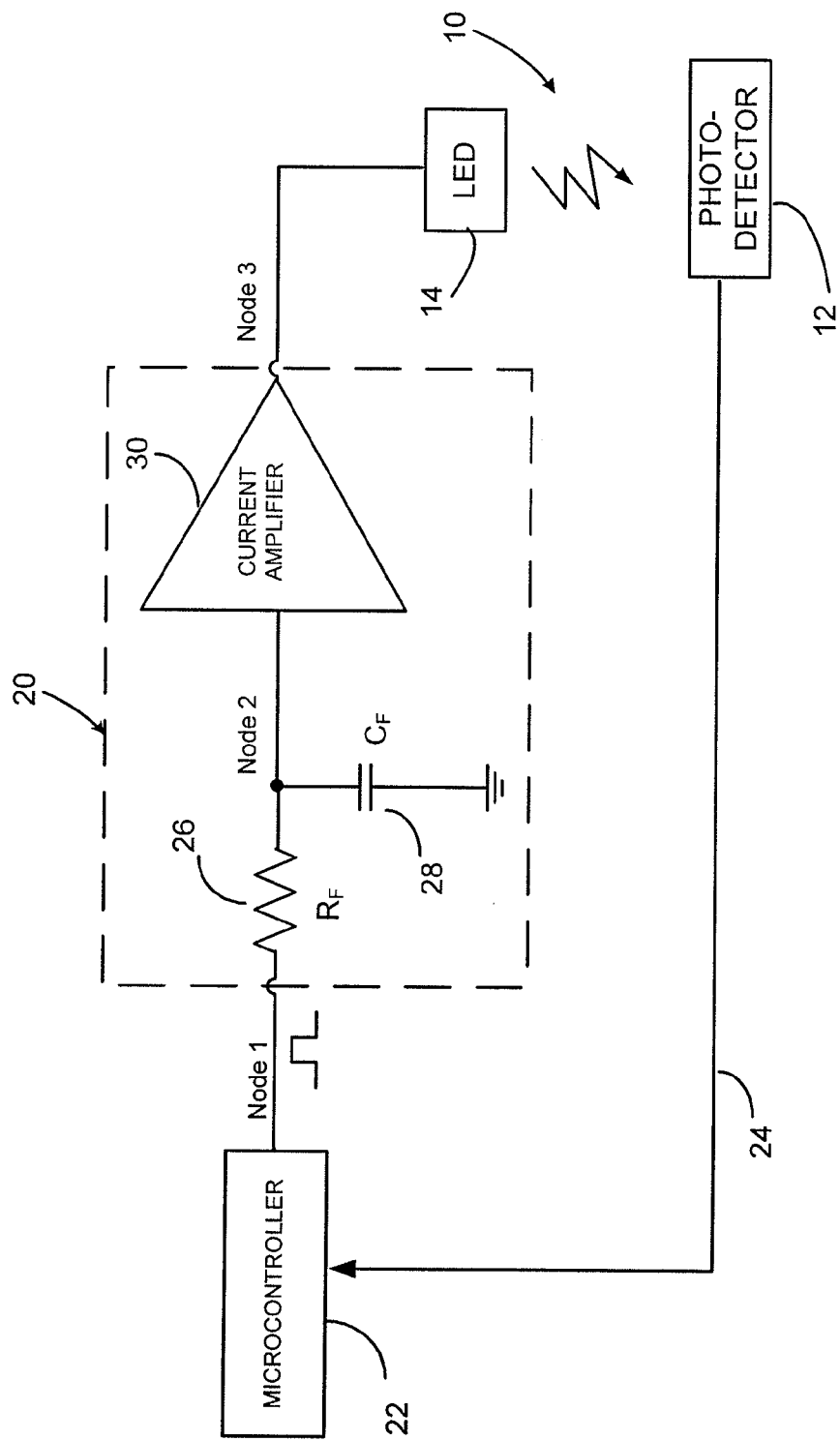
FIG. 2 illustrates a schematic of a circuit for adjusting the current to an LED of an optical sensor according to an embodiment of the present invention.

In describing the present invention, reference is made to the drawings, wherein there is seen in FIG. 2 a schematic of a circuit 20 for adjusting the current to an LED 14 of an optical sensor 10 according to an embodiment of the present invention. Circuit 20 is coupled to a microcontroller 22, such as, for example, a general or special purpose microprocessor or the like, which receives feedback from the photo-detector 12 of an optical sensor 10 via communication line 24. The feedback from the photo-detector 12 provides an indication to the microcontroller 22 as to when the photo-detector 12 is in an "unblocked" state, which indicates sufficient illumination by the LED 14 of the optical sensor 10. The microcontroller 22 outputs a digital pulse at Node 1, whose duty cycle is determined based on the feedback from the photo-detector 12, that is input to circuit 20 and is used to control the current provided to the LED 14.

The pulse output from the microcontroller 22 is passed through a low-pass filter formed by a resistor 26, coupled between Node 1 and a second Node 2, and capacitor 28, coupled between Node 2 and ground, which filters the pulses into a constant DC voltage, whose value is dependent upon the duty cycle of the pulse width. The constant DC voltage is output on Node 2. This DC voltage is supplied to the input of a current amplifier 30, which converts the voltage into a current that is output from the current amplifier on Node 3 and used to supply the LED 14. Thus, the amount of current supplied to the LED 14 directly depends on the duty cycle of the pulse width output by the microcontroller 22. As previously described, the current provided to the LED 14 controls the intensity of the light output by the LED 14, and the output voltage of a photo-detector 12 depends on the received light that is output from the LED 14.

The combination of the frequency of the pulse and the roll-off frequency of the low-pass filter must be set properly. Too high a filter roll-off frequency or too low a pulse frequency would result in the input to the amplifier having excessive voltage ripple, which would translate to ripple in the current of the LED 14. The filter roll-off frequency ($F_{ROLLOFF}$) can be determined by the following equation, where $R_F$ is the value of resistor 26 and $C_F$ is the value of capacitor 28:

$$F_{ROLLOFF} = 1/(2\pi R_F C_F) \qquad \text{Equation (1)}$$

The frequency of the pulse width modulation $F_{PWM}$ should be selected such that:

$$F_{PWM} >> F_{ROLLOFF} \qquad \text{Equation (2)}$$

Utilizing the above equations (1) and (2) will ensure that there is minimal ripple in the current of the LED 14, which could lead to improper operation of the optical detector 10.

Figure 3:
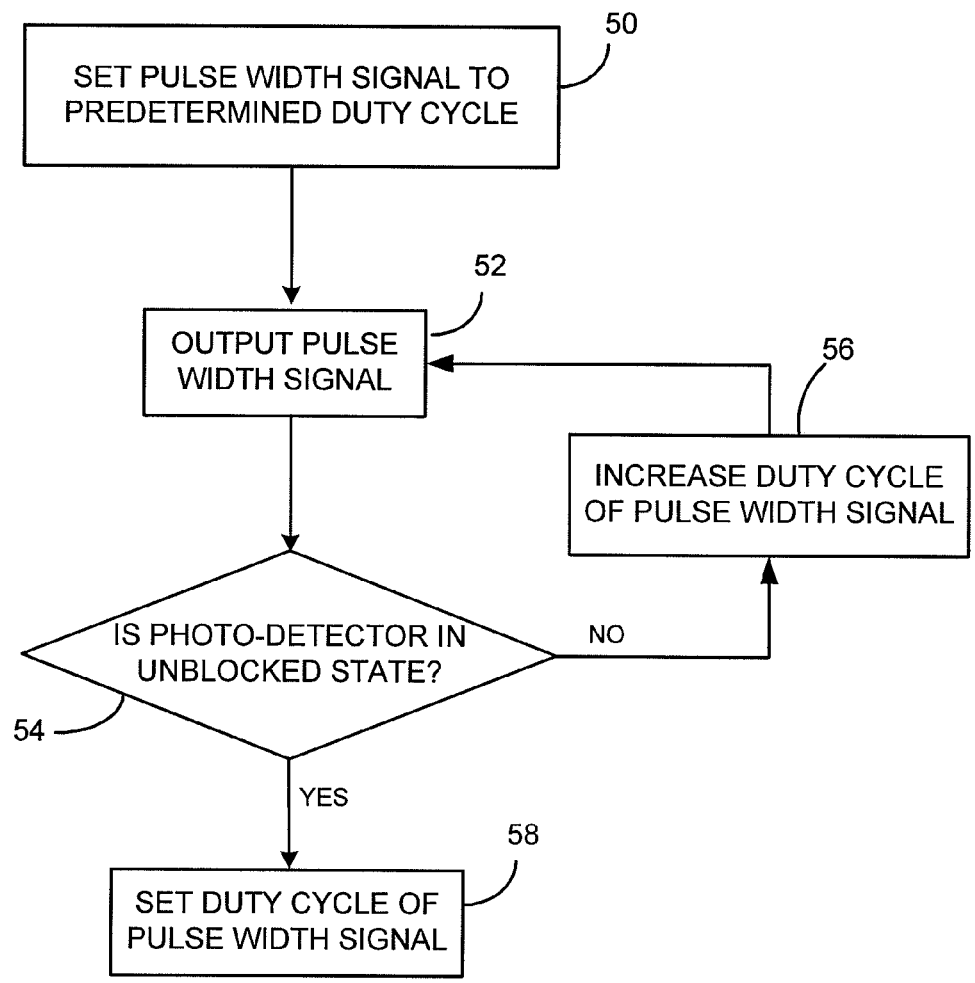
FIG. 3 illustrates in flow diagram form the operation of the circuit of FIG. 2 according to an embodiment of the present invention.

FIG. 3 illustrates a calibration/setting routine that will be performed by the microcontroller 22 in conjunction with circuit 20 at various intervals, such as, for example, upon the start-up of the machine in which they are installed, after a certain number of cycles, etc. It should be understood that the timing of the calibration/setting routine can be set to any desired interval or upon the occurrence of some event as desired. The only requirement for performing this operation is that the light being emitted by the LED 14 is not blocked by any object (such as a mail piece) from reaching the photo-detector 12. Generally, the microcontroller 22 will output a pulse whose positive duty cycle is representative of the intended output value of current to the LED 14. For example to supply 25% of the maximum output, the pulse would have an on-time to off-time ratio of 25%. To supply 50% of the maximum output, the pulse would be a square wave with the off-time equal to the on-time. To supply 75% of the maximum output, the pulse would have an on-time to off-time ratio of 75%. Preferably, internal timer resources of the microcontroller 22 are utilized to control the pulse width modulated signal. It should be noted, however, that if there are an insufficient number of available timers on the microcontroller 22 to supply a pulse signal to all of the optical detectors 10 provided in a machine, a device such as a Field Programmable Gate Array (FGPA) or Complex Programmable Logic Device (CPLD) could be utilized to generate the pulse width modulated signal. Such generators can be controlled by the microcontroller 22 through any standard bus protocol.

To start the calibration/setting routine, in step 50 the duty cycle of the pulse width signal is set by the microcontroller 22 to some predetermined value, such as, for example, 10%. Thus, the pulse width signal will have an on-time to off-time ratio of 10%. In step 52, the microcontroller 22 outputs a pulse width modulated signal (or causes one to be output if an FPGA or CPLD is used) having the predetermined duty cycle. This signal is input to the circuit 20 where it is converted by the low-pass filter formed by resistor 26 and capacitor 28 into a DC voltage, which is input to the current amplifier 30. The output of the current amplifier 30, as described above, is dependent upon the input voltage and supplies the current to the LED 14. The current provided to the LED 14 will cause the LED 14 to illuminate, with the light being received by the photo-detector 12. In step 54, the microcontroller 22, based on the feedback received from the photo-detector 12, will determine if the photo-detector 12 is in an "unblocked" state, i.e., the light being detected by the photo-detector 12 has reached a threshold level such that the output of the photo-detector 12 indicates it is not blocked. If it is determined in step 54 that the photo-detector 12 does not indicate it is not blocked, i.e., it is not receiving sufficient light from the LED 14, then in step 56 the microcontroller 22 will increase the duty cycle of the pulse width signal by some predetermined amount, such as, for example, by 5%. Returning to step 52, the pulse width signal with the increased duty cycle is output by the controller 22, and in step 54 it is again determined if the photo-detector 12 indicates that sufficient light is being detected to be in an "unblocked" state.

This loop will continue through steps 52, 54 and 56, with the duty cycle being increased, until in step 54 it is determined that the photo-detector 12 is receiving sufficient light from the LED 14 to be in an unblocked state. When this occurs, then in step 58 the duty cycle of the pulse width signal is set by the microcontroller 22 based on the duty cycle at which the photo-detector 12 indicated the unblocked state. For example, it could be set at the duty cycle at which the photo-detector 12 indicated the unblocked state, or could be set at some higher value, e.g., an additional 5%, to provide a margin for error. Thus, the amount of current supplied to the LED 14 is adjusted each time the calibration/setting routine is performed such that compensation can be made for variations in an LED 14 (e.g., manufacturing tolerances), reduction in brightness of the LED 14 due to aging, and build up of contaminants, such as paper dust, on the photo-detector 12 and/or LED 14. The amount of current supplied to the LED 14 is sufficient such that the photo-detector 12 will indicate an unblocked state when nothing is blocking the light path between the LED 14 and photo-detector 12, e.g., a mail piece, without being excessive such that the overall operating life of the LED 14 is not reduced, and the light emitted by the LED 14 is not excessive such that it will pass through thinner materials. In addition, by implementing the circuit 20 using the microcontroller 22 and simple low-pass filter, a digital to analog converter for each optical detector 10 is not required, thereby significantly reducing the cost, especially for systems having a large number of sensors.

Figure 4:
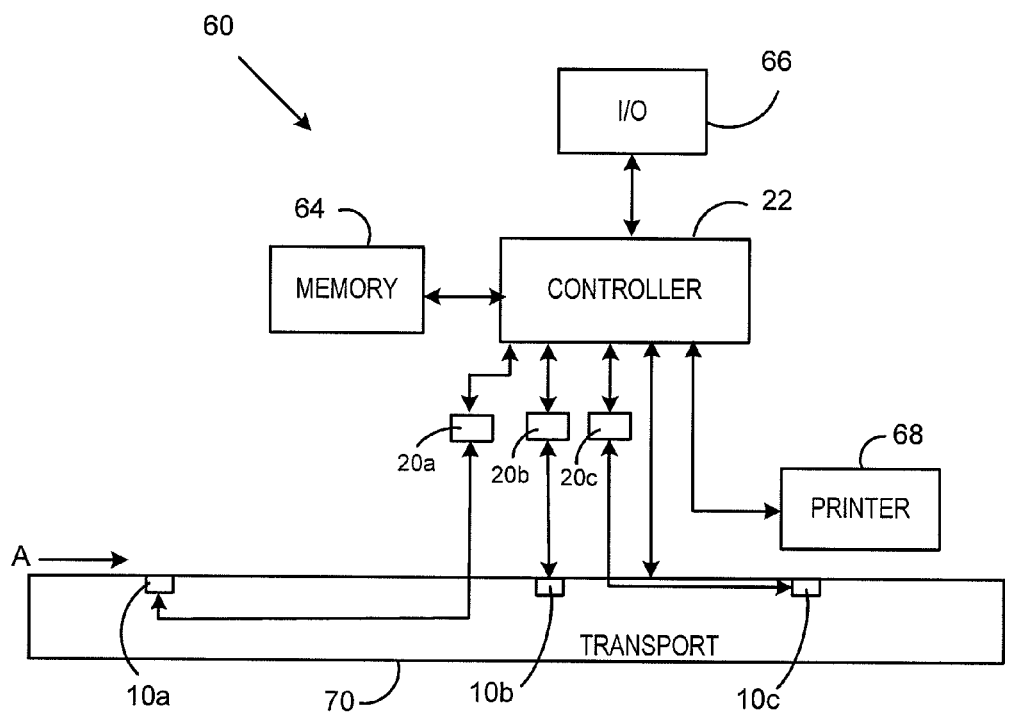
FIG. 4 illustrates in block diagram form a portion of a mail processing system according to the present invention.

FIG. 4 illustrates in block diagram form a portion of a mail processing system, and more specifically a mailing machine 60, in which the present invention can be utilized. It should be noted that while the following description is being made with respect to a mailing machine, the present invention is not so limited and can be utilized in any type of system that utilizes optical sensors. Mailing machine 60 includes controller 22 to control operation of the mailing machine 60. A memory 64 is coupled to the controller 22 for storage of data. Controller 22 is coupled to one or more input/output devices 66, such as, for example, a keyboard and/or display unit for the input and output of various data and information. A printer 68, utilized to print postage indicia generated by the controller 22 on mail pieces, is coupled to controller 22. A transport 70, including, for example, rollers and/or belts, is utilized to transport mail pieces through the mailing machine 60 in the direction indicated by arrow A based on signals provided from the controller 22. The transport 70 will transport the mail pieces through various stages of the mailing machine 60, not all of which are shown in FIG. 4, e.g., the printer 68 such that printing can occur on each mail piece. Optical sensors, such as, for example, sensors 10a, 10b, 10c, located along the transport 70 provide signals to the controller 22 to indicate the position of a mail piece on the transport 70. Each sensor 10 is coupled to a circuit 20a, 20b, 20c as described with respect to FIG. 2, that controls the amount of current provided to the LED of the sensor 10. Each of the sensors are calibrated/set using the routine described with respect to FIG. 3.

Thus, according to the present invention, the LED current of an optical sensor is adjusted using a high frequency pulse-width modulated signal generated from a microcontroller. Based on feedback provided by the photo-detector as to the amount of light being detected, the duty cycle of the signal can be adjusted by the microcontroller. The signal passes through a low pass filter which averages the modulated signal into a DC voltage, which is then used to control a current amplifier circuit that provides current to the LED of the optical sensor. When used in a system application, the sensor control of the present invention enables a microcontroller to utilize internal timer resources to adjust the current to the LED of an optical sensor. This adjustability enables the system to compensate for variations in sensor LED's and the LED brightness reduction to due aging and/or build-up of contaminants such as paper dust on the photo-detector and/or LED. This adjustability is provided with only an additional low pass filter, e.g., a single resistor and capacitor, instead of a complex, expensive digital to analog converter chip.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A circuit for controlling current supplied to an optical sensor having a light emitting diode and photo-detector, the circuit comprising:
   a controller to generate a pulse width modulated signal at a first node, the controller coupled to the photo-detector of the optical sensor to receive signals indicative of light being detected by photo-detector;
   a low pass filter coupled to the first node, the low pass filter filtering the pulse width modulated signal into a constant voltage signal that is dependent on a duty cycle of the pulse width modulated signal and outputting the constant voltage signal on a second node; and
   a current amplifier coupled to the second node, the current amplifier converting the constant voltage signal into a current that is dependent upon the constant voltage signal and outputting the current to the light emitting diode of the optical sensor to cause the light emitting diode to illuminate,
   wherein the controller changes the duty cycle of the pulse width modulated signal based on the signals received from the photo-detector thereby changing the current that is supplied to the light emitting diode.

2. The circuit of claim 1, wherein the low pass filter further comprises:
   a resistor coupled between the first node and the second node; and
   a capacitor coupled between the second node and ground.

3. The circuit of claim 1, further comprising:
   a field programmable gate array coupled to the controller, wherein the controller causes the field programmable gate array to generate the pulse width modulate signal.

4. The circuit of claim 1, further comprising:
   a programmable logic device coupled to the controller, wherein the controller causes the programmable logic device to generate the pulse width modulate signal.

5. A mail processing system comprising:
   a controller to control operation of the mail processing system;
   a transport device to transport mail pieces along a transport path of the mail processing system, the transport device being controlled by the controller;
   at least one optical sensor located along the transport device for determining a location of a mail piece along the transport path, the optical sensor including a light emitting diode and photo-detector, the photo-detector being coupled to the controller to provide signals indicative of light being detected by the photo-detector to the controller; and
   a circuit for controlling current supplied to the optical sensor, the circuit including a low pass filter to filter a pulse width modulated signal generated by the controller into a constant voltage signal that is dependent on a duty cycle of the pulse width modulated signal, and a current amplifier coupled to the low pass filter to convert the constant voltage signal into a current that is dependent upon the constant voltage signal and output the current to the light emitting diode of the optical sensor to cause the light emitting diode to illuminate, wherein the controller changes the duty cycle of the pulse width modulated signal based on the signals received from the photo-detector thereby changing the current that is supplied to the light emitting diode.

6. The mail processing system of claim 5, wherein the low pass filter further comprises:
   a resistor and a capacitor.

7. The mail processing system of claim 5, wherein the circuit for controlling the current supplied to the optical sensor further comprises:
   a field programmable gate array coupled to the controller, wherein the controller causes the field programmable gate array to generate the pulse width modulate signal.

8. The mail processing system of claim 5, wherein the circuit for controlling the current supplied to the optical sensor further comprises:
   a programmable logic device coupled to the controller, wherein the controller causes the programmable logic device to generate the pulse width modulate signal.

9. The mail processing system according to claim 5, wherein the mail processing system is a mailing machine.

10. The mail processing system according to claim 5, wherein the mail processing system is an inserting machine.

11. A method for controlling current supplied to an optical sensor having a light emitting diode and a photo-detector, the method comprising:

generating, by a controller, a pulse width modulated signal;

filtering, by a low pass filtering device, the pulse width modulated signal into a constant voltage signal that is dependent on a duty cycle of the pulse width modulated signal;

converting, by a current amplifier, the constant voltage signal into a current that is dependent upon the constant voltage signal;

outputting the current to the light emitting diode of the optical sensor to cause the light emitting diode to illuminate; and changing the duty cycle of the pulse width modulated signal based on feedback signals received from the photo-detector indicative of light being detected by the photo-detector thereby changing the current that is supplied to the light emitting diode.

12. The method of claim 11, wherein the low pass filtering device comprises a resistor and capacitor.

13. The method of claim 11, wherein generating a pulse width modulated signal further comprises:
   controlling, by the controller, a field programmable gate array to generate the pulse width modulate signal.

14. The method of claim 11, wherein generating a pulse width modulated signal further comprises:
   controlling, by the controller, a programmable logic device to generate the pulse width modulate signal.

15. The method according to claim 11, wherein the optical sensor is provided in a mail processing system.

* * * * *